United States Patent
Bigaj et al.

(10) Patent No.: US 11,301,351 B2
(45) Date of Patent: Apr. 12, 2022

(54) MACHINE LEARNING BASED DATA MONITORING

(71) Applicant: International Business Machines Corporation, Armonk, NY (US)

(72) Inventors: Rafal Bigaj, Cracow (PL); Lukasz G. Cmielowski, Cracow (PL); Wojciech Sobala, Cracow (PL); Maksymilian Erazmus, Zasow (PL)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 16/832,215

(22) Filed: Mar. 27, 2020

(65) Prior Publication Data
US 2021/0303436 A1 Sep. 30, 2021

(51) Int. Cl.
*G06F 11/34* (2006.01)
*G06F 17/15* (2006.01)
*G06N 20/00* (2019.01)
*G06K 9/62* (2022.01)

(52) U.S. Cl.
CPC .......... *G06F 11/3409* (2013.01); *G06F 17/15* (2013.01); *G06K 9/6262* (2013.01); *G06N 20/00* (2019.01)

(58) Field of Classification Search
CPC .. G06F 11/3409; G06F 17/15; G06F 11/3452; G06F 2201/87; G06K 9/6262; G06N 20/00
See application file for complete search history.

(56) References Cited

U.S. PATENT DOCUMENTS

| | | | |
|---|---|---|---|
| 9,460,399 B1* | 10/2016 | Stacey | G06F 16/00 |
| 10,198,346 B1* | 2/2019 | Cole | G06F 11/3664 |
| 10,270,668 B1 | 4/2019 | Thompson et al. | |
| 10,331,657 B1* | 6/2019 | Cole | G06F 16/2365 |
| 10,346,434 B1* | 7/2019 | Morkel | G06F 16/27 |

(Continued)

FOREIGN PATENT DOCUMENTS

| | | | |
|---|---|---|---|
| CN | 107392319 A | 11/2017 | |
| CN | 109102396 A | 12/2018 | |

(Continued)

OTHER PUBLICATIONS

PCT/IB2021/051533 International Search Report, dated Jun. 1, 2021, 8 pages, from related application P201908287PCT01.

(Continued)

*Primary Examiner* — Mohammad K Islam
(74) *Attorney, Agent, or Firm* — Nolan M. Lawrence

(57) ABSTRACT

An overall performance metric of a computer system may be determined for each bin of the set of analysis bins. In case one or more bins of the set of analysis bins do not have at least a predefined minimum number of records, a new set of analysis bins may be redefined by joining analysis bins of the set of analysis bins. For each bin of the redefined set of bins a machine learning (ML) performance metric of the ML model may be computed. The ML performance metric may be estimated for the set of analysis bins using the ML performance metrics of the redefined bins. The computer system may be configured based on a correlation over the set of analysis bins between the computed overall performance metric and the ML performance metric.

16 Claims, 5 Drawing Sheets

(56) References Cited

U.S. PATENT DOCUMENTS

| | | | |
|---|---|---|---|
| 11,227,162 B1* | 1/2022 | Lu | G06N 20/00 |
| 2012/0133789 A1 | 5/2012 | Wu | |
| 2014/0129423 A1* | 5/2014 | Murphy | G06Q 20/10 |
| | | | 705/39 |
| 2014/0143024 A1* | 5/2014 | Whitler | G06Q 30/06 |
| | | | 705/7.36 |
| 2014/0180826 A1* | 6/2014 | Boal | G06Q 20/209 |
| | | | 705/14.66 |
| 2016/0358099 A1* | 12/2016 | Sturlaugson | G06N 5/043 |
| 2018/0262618 A1* | 9/2018 | Stern | H04M 3/5175 |
| 2019/0146424 A1 | 5/2019 | Buda et al. | |
| 2019/0197057 A1 | 6/2019 | Yan | |
| 2019/0392075 A1* | 12/2019 | Han | G06N 20/00 |
| 2020/0019881 A1* | 1/2020 | Luo | G06F 17/18 |
| 2020/0193234 A1* | 6/2020 | Pai | G06K 9/6262 |
| 2021/0097541 A1* | 4/2021 | Nanduri | G06Q 20/4016 |
| 2021/0291046 A1* | 9/2021 | Bansal | A63F 13/35 |
| 2021/0383407 A1* | 12/2021 | Pati | G06Q 40/12 |
| 2022/0012226 A1* | 1/2022 | Mihály | G06F 9/52 |
| 2022/0019950 A1* | 1/2022 | Sabri | G06Q 10/0635 |
| 2022/0027413 A1* | 1/2022 | Quint | G06F 16/9535 |
| 2022/0027951 A1* | 1/2022 | Flowers | G06Q 30/0207 |

FOREIGN PATENT DOCUMENTS

| | | |
|---|---|---|
| CN | 109325639 A | 2/2019 |
| CN | 109543925 A | 3/2019 |

OTHER PUBLICATIONS

Chen et al., "Slice-based Learning: A Programming Model for Residual Learning in Critical Data Slices," To appear in NeurIPS 2019 (Preprint. Under review), arXiv: 1909.06349, Sep. 2019, pp. 1-16.

Chung et al. "Automated Data Slicing for Model Validation: A Big data—AI Integration Approach," arXiv:1807.06068v3, Jan. 7, 2019, pp. 1-13.

* cited by examiner

MACHINE LEARNING BASED DATA MONITORING

BACKGROUND

The present disclosure relates to the field of digital computer systems, and more specifically, to a method for controlling operation of a computer system.

Machine learning models are increasingly used in data monitoring. However, a machine learning model may be inaccurate for several reasons—for example, bias in training data, due to one or more of the following: prejudice in labels, under-/over-sampling, or yields models with unwanted bias. Monitoring of machine learning may not always identify these biases.

SUMMARY

Various embodiments provide a method, system, and computer program product for controlling operation of a computer system as described by the disclosure. In one aspect, the disclosure relates to controlling operation of a computer system, the computer system being configured to perform data transactions and to evaluate a property of the data transactions using a machine learning (ML) model.

A set of analysis bins is determined. An analysis bin represents a set of values of an attribute of records of the data transactions. An overall performance metric of the computer system is computed. The overall performance metric indicates a transaction execution performance of the computer system for each analysis bin of the set of analysis bins, using records of the transactions having attribute values that are represented by the analysis bin. In case one or more analysis bins of the set of analysis bins do not have at least a predefined minimum number of records, redefining a new set of analysis bins by joining analysis bins of the set of analysis bins. For each analysis bin of the redefined set of analysis bins computing a machine learning performance metric of the ML model using records having attribute values that are represented by each analysis bin. Estimating the ML performance metric in each bin of the set of analysis bins using the ML performance metrics of the set of redefined analysis bins. In case each analysis bin of the set of analysis bins has at least the minimum number of records, computing the ML performance metric in each analysis bin of the set of analysis bins. The computer system is configured, based on a correlation over the set of analysis bins between the computed overall performance metric and the ML performance metric, for enabling a positive correlation between the overall and ML performance metrics of further performed data transactions.

BRIEF DESCRIPTION OF THE DRAWINGS

In the following embodiments of the disclosure are explained in greater detail, by way of example only, making reference to the drawings in which.

DETAILED DESCRIPTION

Figure 1:
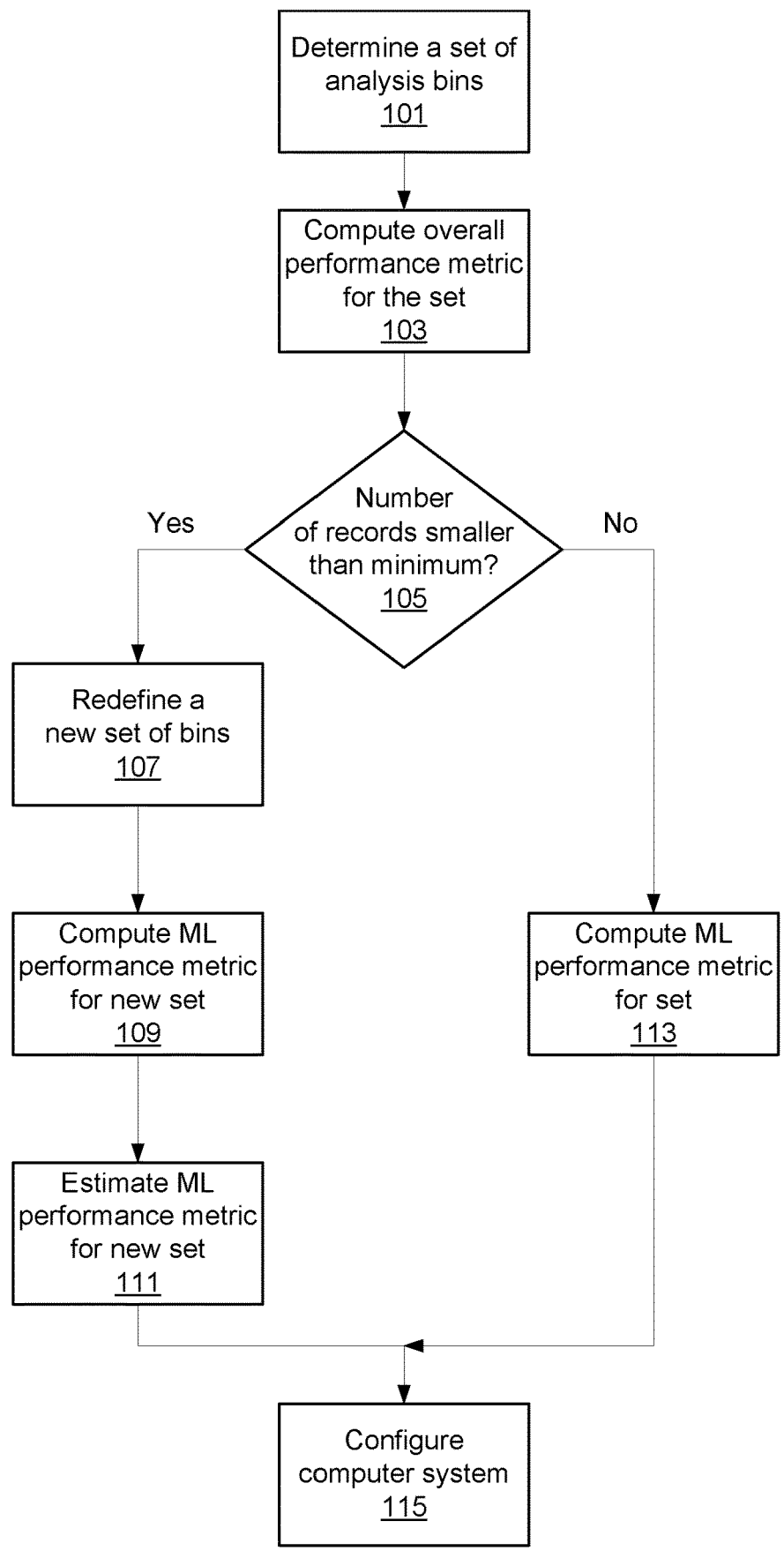
FIG. 1 is a flowchart of a method for controlling operation of a computer system in accordance with an example of the present disclosure.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The continuous increase in data has driven significant investments in artificial intelligence (AI) solutions to help extract insights from data. However, choosing the right AI services to provide trusted and accurate system configurations may be challenging.

The present disclosure may enable a machine learning system (MLS) to evaluate, to improve, or update the AI solution so that the computer system can operate more efficiently (e.g., using less memory, providing more accurate results, using fewer iterations of a machine learning model). For example, the computer system may leverage the MLS to prevent processing unnecessary extra operations caused by non-adapted AI solutions.

When monitoring data transactions using an artificial intelligence solution, it may be important to identify the technical benefit that can be gained from investment in improving an existing machine learning model. For that, the correlations between machine learning model metric values and overall indicator values may advantageously be used to provide a meaningful recommendation. In particular, the computer system configurations of the MLS may rely not only on a particular AI metric, but on the impact it has on the overall process. An MLS may be configured to measure the overall impact (e.g., using overall indicator values). In addition, the MLS of the present disclosure may be advantageous in case of relatively rare data (e.g., a lack of available data) with which a machine learning model metric value cannot be determined (calculation of AI metrics may require high amounts of data). The MLS of the present disclosure may provide an approximation of machine learning model metric values to solve the problem of insufficient data.

According to some embodiments, the MLS may, in case the correlation is a negative or a zero correlation, performing an update may comprise any one of: retraining the ML model, adding an additional ML model for providing a combined evaluation of the property or replacing the ML model by another ML model, wherein the configuring of the computer system comprises using the performed update for evaluating the further transactions.

For example, after adding an additional ML model, the ML performance metric may be computed for each of the ML models and the resulting values may be combined. The combination may for example be a weighted sum or the average of the values. The weighted sum may for example use weights associated with the ML models. The weights may for example be user defined.

According to some embodiments of the MLS, in case of no correlation between the overall performance metric and the ML performance metric in the set of analysis bins, the ML model may be replaced with another ML model.

According to some embodiments of the MLS, in case the correlation between the overall performance metric and the ML performance metric in the set of analysis is a positive correlation, this may indicate improving the ML model and may include retraining the ML model.

The ML model may for example have been trained or adapted to a given type of data (e.g., data of a given region, set, domain, etc.). The retraining may for example be performed by increasing the size of a training set that has been previously used to initially train the ML model, wherein the retraining is performed using the increased size training set. In another example, the retraining may be performed using a new training set that comprises up-to-date data. This may update the ML model so that it can be used for an accurate monitoring of data transaction processing.

In one example, the computer system may be configured to perform the computation of the ML performance metrics as part of a given monitoring process of the data transactions at the computer system. For example, the computer system may provide alerts or may stop running in case of a suspicious value of the ML performance metric. The performed update of this may enable the computer system to improve the monitoring of further data transactions by for example preventing false warning alarms that may be triggered by a non-adapted ML model. This may save resources of the computer system that may be consumed by unnecessary warning alarms.

According to some embodiments, the attribute is a time of occurrence of the data transaction, wherein each bin of the set of analysis bins is representative of a time interval, wherein a redefined bin of the redefined bins is obtained by merging two or more consecutive bins of the set of analysis bins, wherein the estimating is performed by modeling a variation of the ML performance metric as function of the redefined bins, and using the model for determining values of the ML metric in the set of analysis bins. This may seamlessly be integrated with existing systems as most of monitoring systems may perform monitoring of data as function of time. This may further have the advantage of proactively identifying issues and reacting in time. For example, a problem may last, at most, the time duration of the set of analysis bins, as the computer system may be configured immediately after that time duration.

According to some embodiments, the modeling comprises fitting a distribution of the ML performance metric over the redefined bins. The fitting involve a regression analysis, such as a linear regression for estimating the relationships that most closely fits the data points according to a specific mathematical criterion. This may enable a systematic and accurate estimation of the values of the ML performance metric. Accurate estimation of the metric values may enable a reliable control/operation of the computer system. This may enable a calculation of the machine learning model metric values on a bigger subset covering longer time intervals in the similar way as in the rolling mean calculation. The calculated metrics can be then used to calculate more granular results using e.g., a cubic spline approximation.

According to some embodiments, each analysis bin of the set of analysis bins may represent a set of values of a different attribute of records of the data transactions, wherein the set of values are values of a cluster of records formed using the different attribute, wherein a redefined bin of the redefined bins is obtained by merging two or more bins of the set of analysis bins whose associated clusters have a predefined distance to each other.

For example, each bin $B\_i$ of the set of analysis bins may be associated with a respective attribute $Att\_i$. Data records descriptive of data transactions that have been executed by the computer system during a predefined time period (e.g., transactions of last month) may be split based on the values of the attributes $Att\_i$, and one cluster may be created for each distinct attribute $Att\_i$, so that each bin of the set of analysis bins is associated with a respective cluster of records. Those clusters may be joined such that resulting sets of joined clusters may be associated with respective redefined bins e.g., each redefined bin may be associated with a respective set of joined clusters. Each set of joined clusters may have enough data to enable machine learning model metric values calculation on them. The joined clusters of each set may have a distance between centers of the clusters that is smaller than a defined distance. The joined clusters of each set may have the smallest distance between centers of the clusters. In another example, the sets of joined clusters may be user defined. This may enable a sophisticated approach to data slicing based on the input records similarity. This may enable a flexible monitoring of transactions using different attributes.

According to some embodiments, the estimating of the ML performance metric may comprise: for each bin of the set of analysis bins, the ML performance metric of cluster j associated with that bin is defined as follows: $sum(wi*mi)/sum(wi)$, where $mi$ is the ML metric of the set i of joined clusters and $wi$ is calculated as: $meanDtoJ/maxD*nPinJ/nPinCls$, where $meanDtoJ$ is the mean distance between centers of the set i of joined clusters and the center of cluster j, $maxD$ is the maximum distance between centers of the set i of joined clusters, $nPinJ$ is the number of data points in cluster j, and $nPinCls$ is the number of data points in the set i of joined clusters. This may enable an accurate calculation. Calculated metrics can then be used to calculate more granular results using weighted arithmetic means.

According to some embodiments, the method may be performed at a run time of the computer system. This may be advantageous for real time monitoring of data. Monitoring of machine learning models in production environments can be based on scoring payload data analysis performed in run time to calculate metrics like a fairness score, drop in accuracy (drift metric) and others. Machine learning model metric values and overall process indicator values may be set together to allow for correlation finding based on a time based data split, clustering, or other data slicing methods.

According to some embodiments, the method may be repeated for further sets of analysis bins using the controlled computer system. For example, the set of analysis bins may be a current set of analysis bins that covers a current time period e.g., current week. This may enable further monitoring of transaction data of a next time period that is subsequent to the current time period. This may enable an uninterrupted monitoring of data transaction.

According to some embodiments, the MLS comprises further repetition for a different ML performance metric. For example, certain steps, other than the determining of the set of analysis bins and the computation of the overall performance metric, may be repeated for another ML performance metric.

According to some embodiments, the analysis bins are equal size bins.

According to some embodiments, the computing of the overall performance metric or the ML performance metric further comprises normalizing the computed metric.

These embodiments may enable analysis that are scalable with the amount of data and number of bins.

According to some embodiments, the MLS further comprises collecting records of the data transactions that are associated with each analysis bin of the set of analysis bins for performing the computation on collected records.

According to some embodiments, the overall performance metric being a key performance indicator (KPI). Key performance indicators may contain a number of one or more metrics to provide context for the performance of the computer system.

According to some embodiments, the ML performance metric is one of: accuracy of a prediction of the ML model and a fairness score.

FIG. 1 is a flowchart of a method for controlling operation of a computer system in accordance with an example of the present disclosure. The computer system may for example be configured to execute or run data transactions. A data transaction may be a set of operations that perform a task together. The data transaction may for example perform a task such as entering an account debit or credit, or requesting an inventory list. A data transaction may be described by one or more data records. A data record is a collection of related data items: such as a name, date of birth, and class of a particular user that requested the data transaction etc. A record represents an entity, wherein an entity refers to a user, object, transaction, or concept about which information is stored in the record. The terms "data record" and "record" are interchangeably used. The data records may be stored in a graph database as entities with relationships, where each record may be assigned to a node or vertex of the graph with properties being attribute values: such as name, date of birth, etc. The data records may, in another example, be records of a relational database.

A data transaction may be evaluated in order to determine its characteristics or properties. The evaluation may, for example, indicate if the data transaction is abnormal, insecure transaction, etc. The evaluation may for example be performed using a trained ML model. The ML model may for example be trained on historical telecommunication asset failure data e.g., including sensor data, to predict asset failure before it causes an outage. However, information technology operations need to ensure ML models are accurately predicting failure, but the data are incredibly complex. In another example, the ML model may be trained on historical, successful, and unsuccessful forecast override data. The trained ML model may help demand planners make adjustments to their demand forecast. However, the trained ML model may need to be monitored e.g., its accuracy over time, so one can check that AI-powered applications are consistently delivering outcomes as accurate as those produced by knowledge workers. In a further example, the ML model may be trained on historical transaction data to identify suspicious patterns. The trained model may need to be monitored to help banks keep up with ever-changing regulations, and allow financial crime analysts to understand the reasoning behind their models' alert analysis so they can make decisions about which alerts to dismiss and which to escalate.

A set of analysis bins (named 'InitSet' for clarification purpose) may be determined in operation 101. An analysis bin represents a set of values of an analysis attribute of records of the data transactions. The set of analysis bins may or may not be of equal width or size. The analysis attribute may for example be a time of occurrence of a data transaction. In this case the set of analysis bins may cover for example a time range e.g., of one month, and each of the analysis bins may cover a respective time interval e.g., first week of the month, etc. In another example, the analysis attribute may be the age of a user who requested a data transaction. In this case, the set of analysis bins may cover, for example, an age between 18 and 100 years, and each of the analysis bins may cover a respective time range e.g., 80 to 100 years. Assuming for simplification of the description that the set of analysis bins InitSet comprises 10 bins B1 to B10.

Data transactions that are performed by the computer system may be associated to respective analysis bins of the set of analysis bins. Following the above example, all transactions triggered by users having an age between 80 and 100 years may be associated to the analysis bin [80, 100]. This means that each analysis bin X of the set of analysis bins may be associated with data records, wherein each data record of the data records has a value of the analysis attribute that falls within the analysis bin X.

In one example, the set of analysis bins may be user defined e.g., a user input may be received in operation 101, wherein the user input indicates the set of analysis bins. In another example, multiple sets of analysis bins may be predefined (e.g., pre-stored), wherein the determining of the set of analysis bins of operation 101 may comprise selecting (e.g., randomly) a set of analysis bins of the predefined multiple sets of analysis bins. In one example, the set of analysis bins may be determined so that the number of transactions associated with each analysis bin of the set of analysis bins is higher than a predefined number of transactions threshold. This number of transactions threshold may be sufficient to perform an overall performance analysis e.g., for evaluating overall performance metrics.

An overall performance metric of the computer system may be computed in operation 103 for each bin of the set of analysis bins. The computation may be performed using records of the transactions having attribute values that are represented by the analysis bin. The overall performance metric may for example be an average transaction duration. For that, for each analysis bin X of the set of analysis bins, a transaction duration may be determined for each transaction of the transactions that are associated with the analysis bin X. And, the average of the determined transaction durations may be computed and assigned to the analysis bin X. In another example, the overall performance metric may be the number of failed transactions. For that, for each analysis bin X of the set of analysis bins, the number of failed transactions of that bin X may be determined.

A data record descriptive of a transaction may be of one or more types. For example, the transaction may be associated with an overall record descriptive of the overall properties/attributes of the transaction and another ML record that describes the results of performing the ML model on the transaction. The overall record may comprise overall attributes. The ML record may comprise the ML attributes. The ML records be records of a payload logging table. The overall records and the ML records may be linked to each other by a transaction ID that belongs to both records. In another example, a single type record may be used to describe a transaction e.g., the single type record may comprise attributes of both the overall record and the ML record. This single record may comprise empty values for the ML attributes if the ML model is not executed for a transaction of that single record.

It may be determined (inquiry operation 105) if the number of records for one or more analysis bins of the set of analysis is smaller than a predefined minimum number of records. A number of records below the minimum number of records may not be sufficient to perform a ML performance monitoring in a given bin, while it may be sufficient to compute the overall performance metric in operation 103. In case of two different types of records, the inquiry operation 105 may be performed on the ML records. For example, it may be determined in inquiry operation 105 if the number of ML records for one or more analysis bins of the set of analysis is smaller than the predefined minimum number of records. In case of a single type record, it may be determined in inquiry operation 105 if the number of records that have non-empty ML attribute values is smaller than the predefined minimum number of records. For example, inquiry operation 105 may be performed as follows. Each analysis bin X of the set of analysis InitSet may be processed so that to determine if the number of records whose analysis attribute values fall in the bin X is smaller than the predefined minimum number of records.

If it is determined (inquiry operation 105) that the number of records for one or more analysis bins of the set of analysis InitSet is smaller than the predefined minimum number of records, operations 107 to 111 may be performed, otherwise operation 113 may be performed—assuming, for example, that bins B2 and B5 are determined to have a number of records that is smaller than the predefined minimum number of records.

In operation 107, a new or another set of analysis bins (named 'NewSet' for clarification purpose) may be determined or redefined. Following the above example of InitSet, the redefined set of bins NewSet may comprise n bins rB1 to rBn, where n<10. Operation 107 may for example be performed by joining analysis bins of the set of analysis bins InitSet. Following the above example, since only B2 and B5 have a number of records below the predefined minimum number of records, bins B2 and B3 of InitSet may be joined to form a new bin rB2, and bins B4 and B5 of InitSet may be joined to form a new bin rB3. This may result in 8 redefined set of bins rB1 to rB8 of NewSet, wherein rB1 is B1, rB4 is B6, rB5 is B7, rB6 is B8, rB7 is B9 and rB8 is B10, i.e., rB2 and rB3 are redefined. This may make use of an existing set of analysis bins InitSet in order to define the new set of bins. This may save resources because accumulated records for the bins that have not been changed may be reused. In another example, the new set of bins NewSet may be defined independent of the set of analysis bins InitSet of operation 101, by determining a new width for the new set of bins NewSet so that the number of records in each bin of the new set of bins may be higher than the predefined minimum number of records.

For each bin rB of the redefined set of bins NewSet, a ML performance metric of the ML model may be computed in operation 109 using records having attribute values that are represented by each bin rB. The ML performance metric may for example be an accuracy of prediction of the ML model. For example, each record of the ML records may comprise an ML attribute descriptive of the ML prediction accuracy used for evaluating the data transaction of the record. In operation 109, for each bin of the redefined bins NewSet, the accuracies of the ML records of the bin may be averaged in order to provide a value of the ML performance metric of the bin. In another example, the ML performance metric may be a fairness score.

Following the above example, operation 109 may result in 8 values of the ML performance metric, each associated with a respective bin of the redefined set of bins NewSet. However, the overall performance metric has been evaluated 10 times for the analysis bins of InitSet. This may render a correlation analysis between the two metrics not optimal. To solve that, the ML performance metric may be estimated in operation 111 in each bin of the set of analysis bins InitSet using the ML performance metrics of the set of redefined bins NewSet. For example, knowing the 8 values of the ML performance metric in the bins of NewSet, the 10 values of the ML performance metric may be derived for the bins of InitSet. Following the above example, the ML performance metric for bins rB1, rB4, rB5, rB6, rB7 and rB8 of NewSet may be the same for respective bins B1, B6, B7, B8, B9 and B10. The ML performance metric may be estimated for bins B2 to B5 of InitSet by combining metric values (or by extrapolating values) of surrounding bins e.g., B 1, rB1, rB2 and B6. Other examples of performing the estimation are shown in FIGS. 2-3.

In case each bin B of the set of analysis bins InitSet has a number of records higher than the predefined minimum number of records, operation 113 may be performed as follows. For each bin B of the set of bins InitSet, a ML performance metric of the ML model may be computed in operation 113 using records having attribute values that are represented by each bin B.

After executing operation 111 or operation 113, each bin of the set of bins InitSet may have a pair of values of the ML performance metric and the overall performance metric. This may enable a comparison bin by bin the values of the two metrics. In particular, the behavior of a variation of the ML performance metric along the set of bins InitSet may be compared with the behavior of the overall performance metric along the set of bins InitSet. This may enable an accurate correlation analysis of the two metrics and, consequently, the correlation may reliably be used by the present method. For example, based on a correlation over the set of analysis bins InitSet between the computed overall performance metric and the ML performance metric, the computer system may be configured in operation 115 for enabling further transactions to have a positive correlation between the overall and ML performance metrics. The configuration may be based on a correlation between the overall and ML performance metrics. For example, if the correlation is negative, this may indicate that the trained ML model is not adequate for the use case being used. For example, the trained ML model may work well on data from a given domain such as telecommunication. However, for other domains it may not deliver the required accuracy. In another example, after executing operation 111 or operation 113 information may be provided e.g., to a user, wherein the information indicates the correlation between the overall and ML performance metrics. The information may be used by the user e.g., as a monitoring information of the computer system.

The correlation between the two metrics may have the following features. In one example, the correlation between the two metrics may be a strong positive correlation. For example, the ML performance metric drop drives a particular KPI down e.g., the drop in a model fairness score by 2% drives a credit amount granted KPI by 5% down. This indicates that the resource investment in the particular area of the model quality may be important. The system can be configured accordingly to further improve the ML model to avoid a drop in the model fairness score.

In one example, the particular ML performance metric is improving without effect on a KPI. This indicates, for example, that the improvement in the model accuracy by 5% has no effect on the number of clicks. Such insight clearly points that investment in the model accuracy may not worth and a new ML model may be used instead of that ML model.

In one example, there is no correlation at all (or the correlation is very small) between any ML performance metric and the KPI. That can indicate a serious issue with the ML model, where the model outcomes are totally ignored in the process. This could raise an alert to revisit the decision making process and the configuration of the computer system.

Consequently, depending on the correlation between the ML performance metric and the overall performance metric, the computer system may be configured accordingly. The configuration may be performed so that it enables a positive correlation between the two metrics for next transactions to be executed. For example, the ML performance metric computed for future transactions may have improved values that line up with the overall performance metric. The present disclosure may take into account combined effects of multiple monitoring metrics.

For example, operation 115 may automatically trigger a retraining of the ML model. The retraining may be performed using new data that corresponds to the present use cases of the computer system. In another example, the restraining may be performed by increasing a previously used training set in order to improve the accuracy of the trained model with specific inputs from payload analytics to meet goals and adapt to new data. In another example, the ML model may be adapted without having to do a retraining by, for example, updating a minimum sample size and threshold to produce more data on the currently trained model without incurring additional processing costs. This may avoid intensive CPU usage when the underlying data hasn't changed.

Figure 2A:
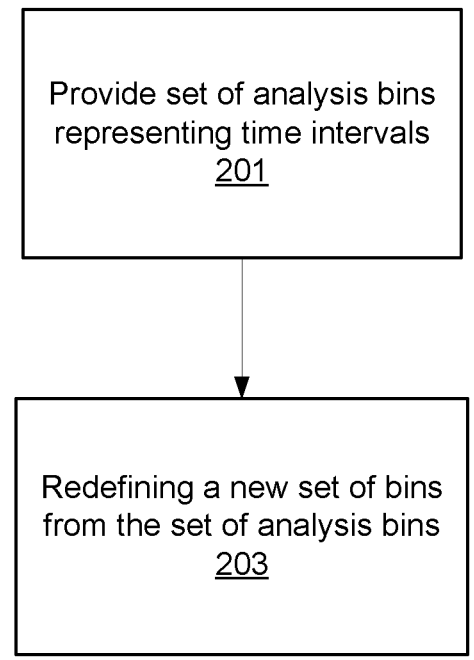
FIG. 2A is a flowchart of a method for defining analysis bins for computing metrics in accordance with an example of the present disclosure.

FIG. 2A is a flowchart of a method for defining analysis bins for computing metrics in accordance with an example of the present disclosure.

Figure 2B:
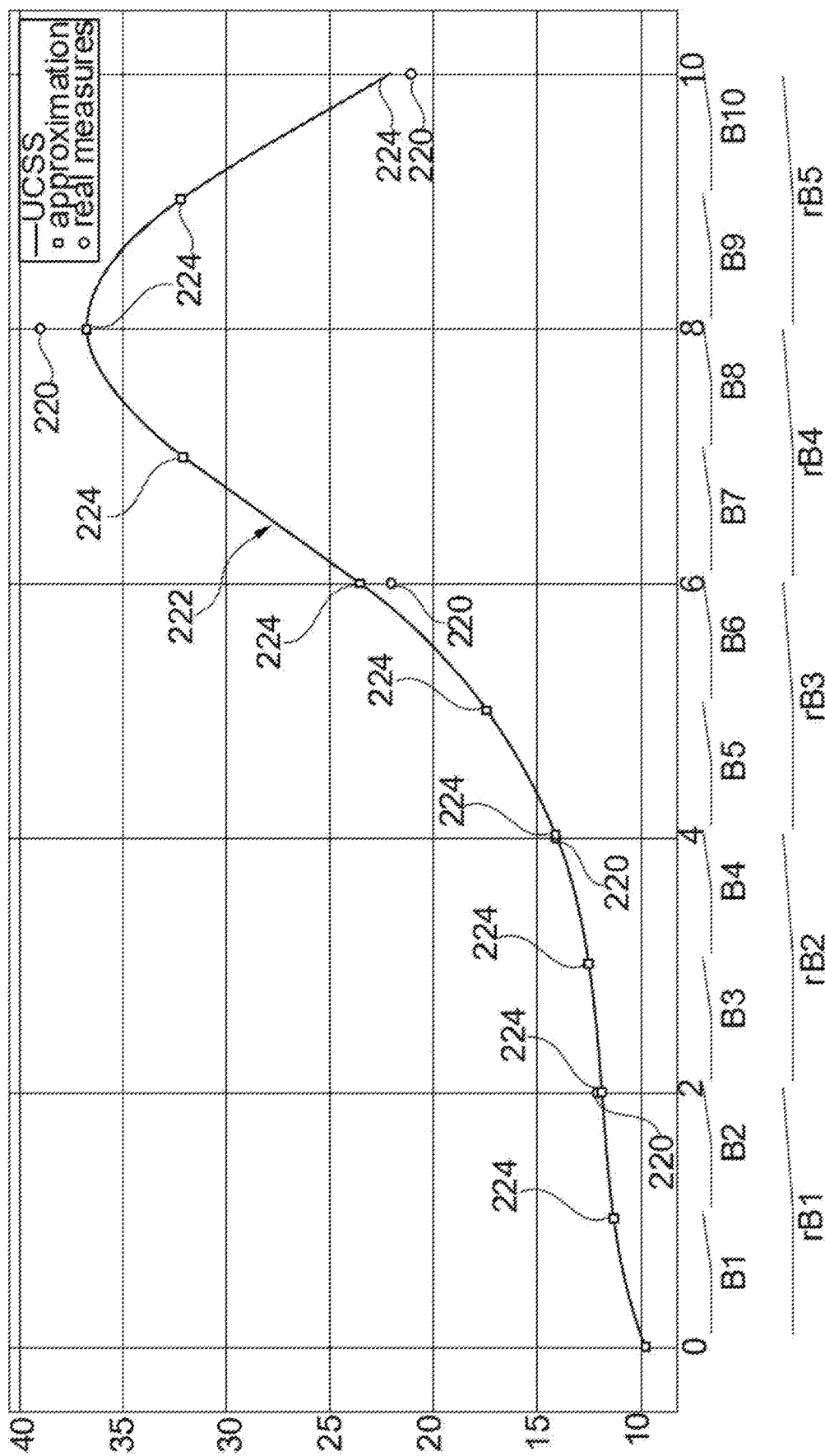
FIG. 2B is a diagram illustrating analysis and metric values in accordance with an example of the present disclosure.

In operation 201, a set of analysis bins B1 to B10 may be provided. The set of analysis bins may cover a time range [tS, tE]=[0 10] as shown in FIG. 2B. The set of analysis bins comprises 10 bins B1 to B10 of width 1 as shown in FIG. 2B. The data in each bin of the bins B1 to B10 may not be sufficient to compute the ML performance metric.

In operation 203, a new set of bins rB1 to rB5 is (re)defined by combining two consecutive bins of the set of 10 bins B1 to B10. This may for example be performed because data in the 10 bins may not be sufficient for computing the ML performance metric. This results in 5 new bins rB1 to rB5 of width 2. For example, new bin rB1 may be obtained by joining bins B1 and B2, new bin rB2 may be obtained by joining bins B3 and B4, new bin rB3 may be obtained by joining bins B5 and B6, new bin rB4 may be obtained by joining bins B7 and B8 and new bin rB5 may be obtained by joining bins B9 and B10.

FIG. 2B further shows for each bin of the new set of analysis bins rB1-rB5, data points 220, which represent values of the ML performance metric in each of the 5 bins rB1 to rB5. In order to estimate the values of the ML performance metric in each bin of the 10 bins B1 to B10, a fit 222 (or modeling) of the distribution of values of the ML performance metric may be performed. The fit 222, which is a cubic spline approximation, may be used to estimate or approximate the values 224 of the ML performance metric in each bin of the 10 bins.

Figure 3A:
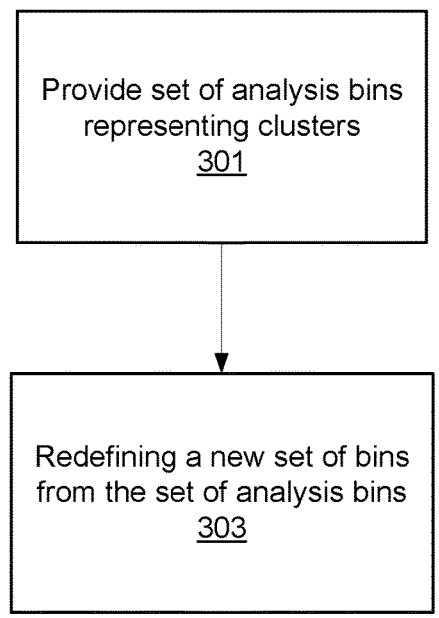
FIG. 3A is a flowchart of a method for defining analysis bins for computing metrics in accordance with an example of the present disclosure.

FIG. 3A is a flowchart of a method for defining analysis bins for computing metrics in accordance with an example of the present disclosure.

Figure 3B:
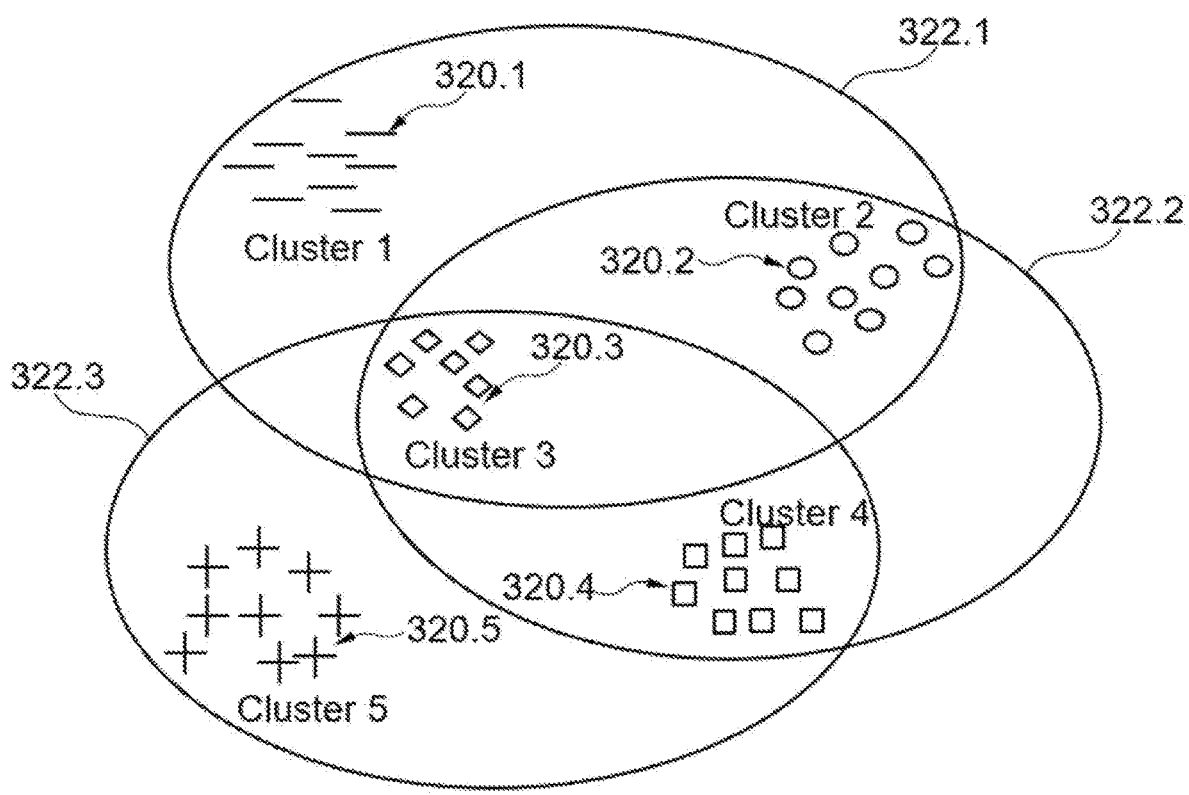
FIG. 3B is a diagram illustrating analysis bins in accordance with an example of the present disclosure.

In operation 301, a set of analysis bins may be provided. The set of analysis bins may cover 5 clusters as shown in FIG. 3B. The set of analysis bins comprises 5 bins each associated with a respective cluster 320.1-5. Each cluster of the clusters 320.1-5 may comprise records having similar values of a respective attribute e.g., cluster 320.1 may comprise records of users having age between 20 and 40 years, and cluster 320.2 may comprise records of users of a given region or country etc.

In operation 303, a new set of bins is defined by combining two or more bins of the set of 5 bins. This may for example be performed because data in the 5 bins may not be sufficient for computing the ML performance metric. This results in 3 new bins 322.1 to 322.3 each associated with a respective set of joined clusters (e.g., a set of joined clusters may be referred to a joined cluster). For example, new bin 322.1 represents the set of joined clusters 320.1, 320.2, and 320.3, new bin 322.2 represents the set of joined clusters 320.4, 320.2, and 320.3, and new bin 322.3 represents the set of joined clusters 320.5, 320.4, and 320.3. The clusters may be joined, for example, based on the distance between them. The distance may be computed using one or more attributes of the records of the clusters. The ML performance metric may be computed for the three bins 322.1 to 322.3. And in order to obtain the ML performance metric for each bin 320.1 to 320.5, the following formula may be used.

For each bin j of the set of analysis bins 320.1 to 320.5, the ML performance metric may be estimated as follows: sum(wi*mi)/sum(wi), where i is the index of the sets of joined clusters which varies from 1 to 3 in this example, where mi is the ML performance metric of the set i of joined clusters and wi is calculated as: meanDtoJ/maxD*nPinJ/nPinCls, where meanDtoJ is the mean distance between centers of the set i of joined clusters and the center of cluster j, mayD is the maximum distance between centers of the set i of joined clusters, nPinJ is the number of data points in cluster j and nPinCls is the number of data points in the set i of joined clusters. In some embodiments, meanDtoJ may represent the following: mean distance between original centers in joined cluster and cluster j center. In some embodiments, maxD may represent the following: max distance between original centers. In some embodiments, nPinJ may represent the following: number of data points in cluster j. In some embodiments, nPinCls may represent the following: max distance between original centers.

Figure 4:
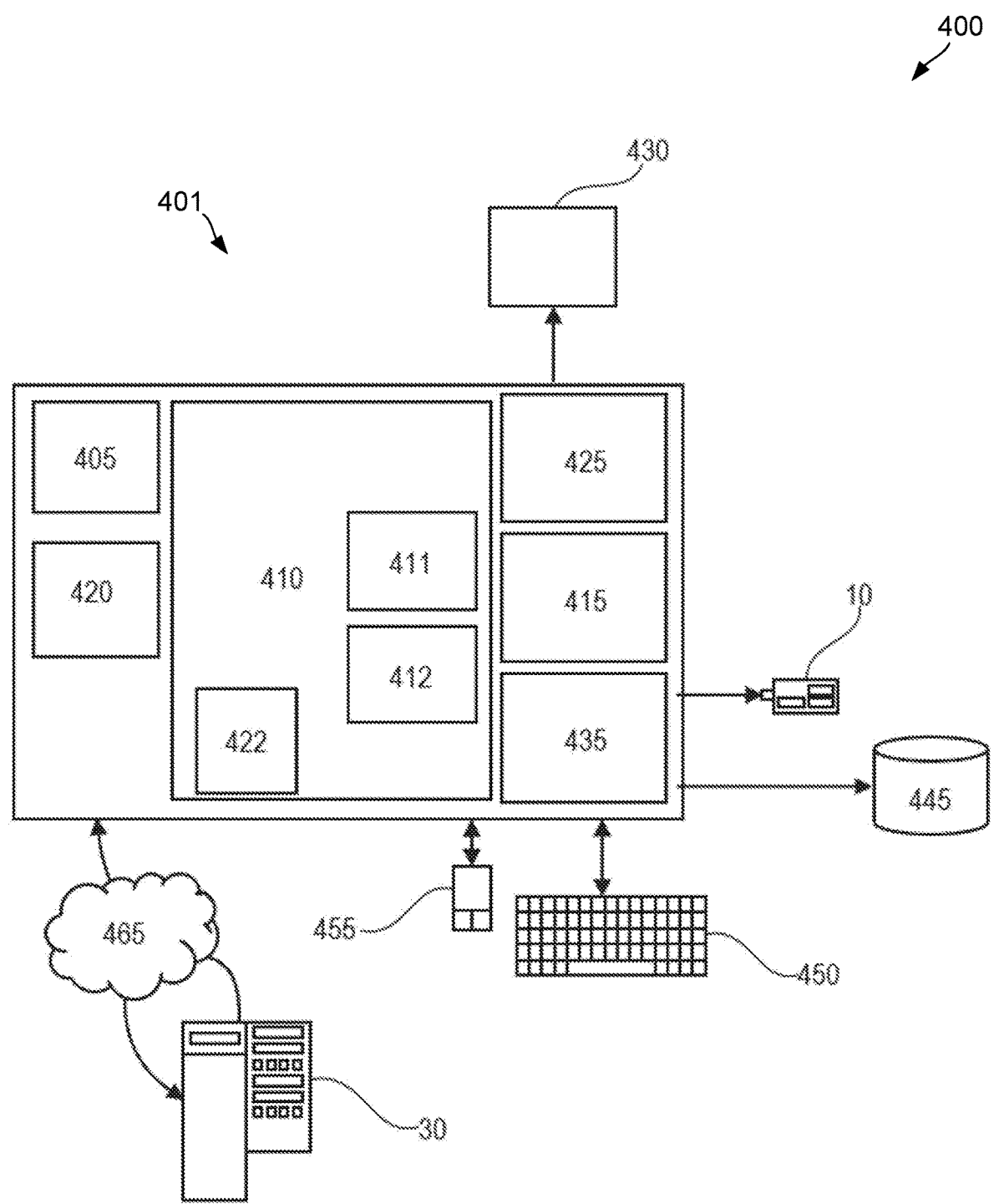
FIG. 4 represents a computerized system, suited for implementing one or more method steps as involved in the present disclosure.

FIG. 4 represents a general computerized system 400 suited for implementing at least part of method steps as involved in the disclosure. It will be appreciated that the methods described herein are at least partly non-interactive, and automated by way of computerized systems, such as servers or embedded systems. In some embodiments though, the methods described herein can be implemented in a (partly) interactive system. These methods can further be implemented in software 412, 422 (including firmware 422), hardware (processor) 405, or a combination thereof. In some embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In some embodiments, in terms of hardware architecture, as shown in FIG. 4, the computer 401 includes a processor 405, memory (main memory) 410 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this disclosure. In the example of FIG. 4, software in the memory 410 includes instructions 412 e.g., instructions to manage databases such as a database management system.

The software in memory 410 shall also typically include a suitable operating system (OS) 411. The OS 411 essentially controls the execution of other computer programs, such as possibly software 412 for implementing methods as described herein.

The methods described herein may be in the form of a source program 412, executable program 412 (object code), script, or any other entity comprising a set of instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object-oriented programming language, which has classes of data and methods, or a procedure programming language, which has routines, subroutines, and/or functions.

In some embodiments, a keyboard 450 and mouse 455 can be coupled to the input/output controller 435. Other output devices such as the I/O devices 445 may include input devices, for example, but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In some embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part, or all of the steps of the methods discussed herein. In some embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) 422. The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present subject matter may comprise the following clauses.

1. A method for controlling operation of a computer system, the computer system being configured to perform data transactions and to evaluate a property of the data transactions using a machine learning, ML, model, the method comprising: determining a set of analysis bins, wherein an analysis bin represents a set of values of an attribute of records of the data transactions;

computing an overall performance metric of the computer system, indicating a transaction execution performance by the computer system, for each bin of the set of analysis bins using records of the transactions having attribute values that are represented by the bin;

in case one or more bins of the set of analysis bins do not have at least a predefined minimum number of records:

redefining a new set of analysis bins by joining analysis bins of the set of analysis bins, for each bin of the redefined set of bins computing a machine learning performance metric of the ML model using records having attribute values that are represented by the each bin;

estimating the ML performance metric in each bin of the set of analysis bins using the ML performance metrics of the set of redefined bins;

in case each bin of the set of analysis bins has at least the minimum number of records, computing the ML performance metric in each bin of the set of analysis bins;

configuring the computer system, based on a correlation over the set of analysis bins between the computed overall performance metric and the ML performance metric, for enabling a positive correlation between the overall and ML performance metrics of further performed data transactions.

2. The method of clause 1, further comprising: in case the correlation is a negative or a zero correlation, performing an update comprising anyone of: retraining the ML model, adding an additional ML model for enabling a combination of evaluations of the property, replacing the ML model by another ML model, wherein the configuring of the computer system comprises using the performed update for evaluating the further transactions.

3. The method of clause 1, in case the correlation between the overall performance metric and the ML performance metric in the set of analysis is a positive correlation, improving the ML model by retraining the ML model using a larger training dataset.

4. The method of any of the preceding clauses, wherein the attribute is a time of occurrence of the data transaction, wherein each bin of the set of analysis bins is representative of a time interval, wherein a redefined bin of the redefined bins is obtained by merging two or more in time consecutive bins of the set of analysis bins, wherein the estimating is performed by modeling a variation of the ML performance metric as function of the redefined bins, and using the ML model for determining values of the ML performance metric in the set of analysis bins.

5. The method of clause 4, the modeling comprising fitting a distribution of the ML performance metric over the redefined bins.

6. The method of any of the preceding clauses 1-3, wherein each analysis bin of the set of analysis bins represents a set of values of a different attribute of records of the data transactions, wherein the set of values are values of a cluster of records formed using the different attribute, wherein a redefined bin of the redefined bins is obtained by merging two or more bins of the set of analysis bins whose associated clusters have a predefined distance to each other.

7. The method of clause 6, wherein the estimating of the ML performance metric comprises: for each bin of the set of analysis bins having, the ML performance metric of cluster j associated with that bin is defined as follows: sum(wi*mi)/sum(wi), where mi is the ML metric of the set i of joined clusters and wi is calculated as: meanDtoJ/maxD*nPinJ/nPinCls, where meanDtoJ is the mean distance between centers of the set i of joined clusters and the center of cluster j, mayD is the maximum distance between centers of the set i of joined clusters, nPinJ is the number of data points in cluster j and nPinCls is the number of data points in the set i of joined clusters.

8. The method of any of the preceding clauses, being performed at a run time of the computer system.

9. The method of any of the preceding clauses, wherein the method is repeated for further sets of analysis bins using the controlled computer system.

10. The method of any of the preceding clauses, further comprising repeating the method for a different ML performance metric.

11. The method of any of the preceding clauses, wherein the analysis bins are equal size bins.

12. The method of any of the preceding clauses, wherein the computing of the overall performance metric or the ML performance metric further comprises normalizing the computed metric.

13. The method of any of the preceding clauses, further comprising collecting records of the data transactions that are associated with each analysis bin of the set of analysis bins for performing the computation on collected records.

14. The method of any of the preceding clauses, the overall performance metric being a key performance indicator KPI.

15. The method of any of the preceding clauses, the ML performance metric is one of: accuracy of a prediction of the ML model and a fairness score.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for controlling operation of a computer system, the computer system being configured to perform data transactions and to evaluate a property of the data transactions using a machine learning (ML), model, the method comprising:

determining a set of analysis bins, wherein an analysis bin represents a set of values of an attribute of records of the data transactions;

computing an overall performance metric of the computer system, the overall performance metric indicating a transaction execution performance by the computer system for each analysis bin of the set of analysis bins using records of the transactions having attribute values that are represented by the analysis bin;

responsive to one or more analysis bins of the set of analysis bins not having at least a predefined minimum number of records:

redefining a new set of analysis bins by joining analysis bins of the set of analysis bins;

for each analysis bin of the redefined set of analysis bins, computing a machine learning performance metric of the ML model using records having attribute values that are represented by each analysis bin of the redefined set;

estimating the ML performance metric in each analysis bin of the set of analysis bins using the ML performance metrics of the set of redefined analysis bins;

responsive to each analysis bin of the set of analysis bins having at least the minimum number of records, computing the ML performance metric in each analysis bin of the set of analysis bins;

configuring the computer system, based on a correlation over the set of analysis bins between the computed overall performance metric and the ML performance metric, for enabling a positive correlation between the overall and ML performance metrics of further performed data transactions.

2. The method of claim 1, responsive to the correlation between the overall performance metric and the ML performance metric in the set of analysis being a negative or a zero correlation, performing an update comprising adding an additional ML model for enabling a combination of evaluations of the property.

3. The method of claim 1, responsive to the correlation between the overall performance metric and the ML performance metric in the set of analysis being a positive correlation, improving the ML model by retraining the ML model using a larger training dataset.

4. The method of claim 1, wherein the attribute is a time of occurrence of the data transaction,
wherein each analysis bin of the set of analysis bins is representative of a time interval,
wherein a redefined bin of the redefined set of analysis bins is obtained by merging two or more in time consecutive bins of the set of analysis bins,
wherein the estimating is performed by modeling a variation of the ML performance metric as function of the redefined set of analysis bins, and
the method further uses the ML model for determining values of the ML performance metric in the set of analysis bins.

5. The method of claim 4, the modeling comprising fitting a distribution of the ML performance metric over the redefined bins.

6. The method of claim 1, wherein each analysis bin of the set of analysis bins represents a set of values of a different attribute of records of the data transactions, wherein the set of values are values of a cluster of records formed using the different attribute, wherein a redefined bin of the redefined bins is obtained by merging two or more bins of the set of analysis bins whose associated clusters have a predefined distance to each other.

7. The method of claim 1, being performed at a run time of the computer system.

8. The method of claim 1, wherein the method is repeated for further sets of analysis bins using the controlled computer system.

9. The method of claim 1, further comprising repeating the method for a different ML performance metric.

10. The method of claim 1, wherein the analysis bins are equal size bins.

11. The method of claim 1, wherein the computing of the overall performance metric or the ML performance metric further comprises normalizing the computed metric.

12. The method of claim 1, further comprising collecting records of the data transactions that are associated with each analysis bin of the set of analysis bins for performing the computation on collected records.

13. The method of claim 1, the overall performance metric being a key performance indicator.

14. The method of claim 1, the ML performance metric is selected from the group consisting of accuracy of a prediction of the ML model, and a fairness score.

15. A system to control operation of a computer system, the system comprising:
a memory; and
a processor, the processor communicatively coupled to the memory, the processor configured to:
determine a set of analysis bins, wherein an analysis bin represents a set of values of an attribute of records of data transactions;
compute an overall performance metric of the computer system, the overall performance metric indicating a transaction execution performance by the computer system, for each bin of the set of analysis bins using records of the transactions having attribute values that are represented by the bin;
in case one or more bins of the set of analysis bins do not have at least a predefined minimum number of records:
redefine a new set of analysis bins by joining analysis bins of the set of analysis bins,
for each bin of the redefined set of bins compute a machine learning (ML) performance metric of a ML model using records having attribute values that are represented by the each bin;
estimate the ML performance metric in each bin of the set of analysis bins using the ML performance metrics of the set of refined bins;
in case each bin of the set of analysis bins has at least the minimum number of records, compute the ML performance metric in each bin of the set of analysis bins;
configure the computer system, based on a correlation over the set of analysis bins between the computed overall performance metric and the ML performance metric, for enabling a positive correlation between the overall and ML performance metrics of further performed data transactions.

16. A computer program product, the computer program product comprising:
one or more computer readable storage media; and
program instructions collectively stored on the one or more computer readable storage media, the program instructions configured to:
determine a set of analysis bins, wherein an analysis bin represents a set of values of an attribute of records of data transactions;
compute an overall performance metric of the computer system, the overall performance metric indicating a transaction execution performance by the computer system, for each bin of the set of analysis bins using records of the transactions having attribute values that are represented by the bin;
in case one or more bins of the set of analysis bins do not have at least a predefined minimum number of records:
redefine a new set of analysis bins by joining analysis bins of the set of analysis bins,
for each bin of the redefined set of bins compute a machine learning (ML) performance metric of a ML model using records having attribute values that are represented by the each bin;
estimate the ML performance metric in each bin of the set of analysis bins using the ML performance metrics of the set of refined bins;
in case each bin of the set of analysis bins has at least the minimum number of records, compute the ML performance metric in each bin of the set of analysis bins;
configure the computer system, based on a correlation over the set of analysis bins between the computed overall performance metric and the ML performance metric, for enabling a positive correlation between the overall and ML performance metrics of further performed data transactions.

* * * * *